Aug. 16, 1966   J. M. BOSKO ETAL   3,266,813
MOBILE GARDEN AND REFUSE CART
Filed March 18, 1964   2 Sheets-Sheet 1
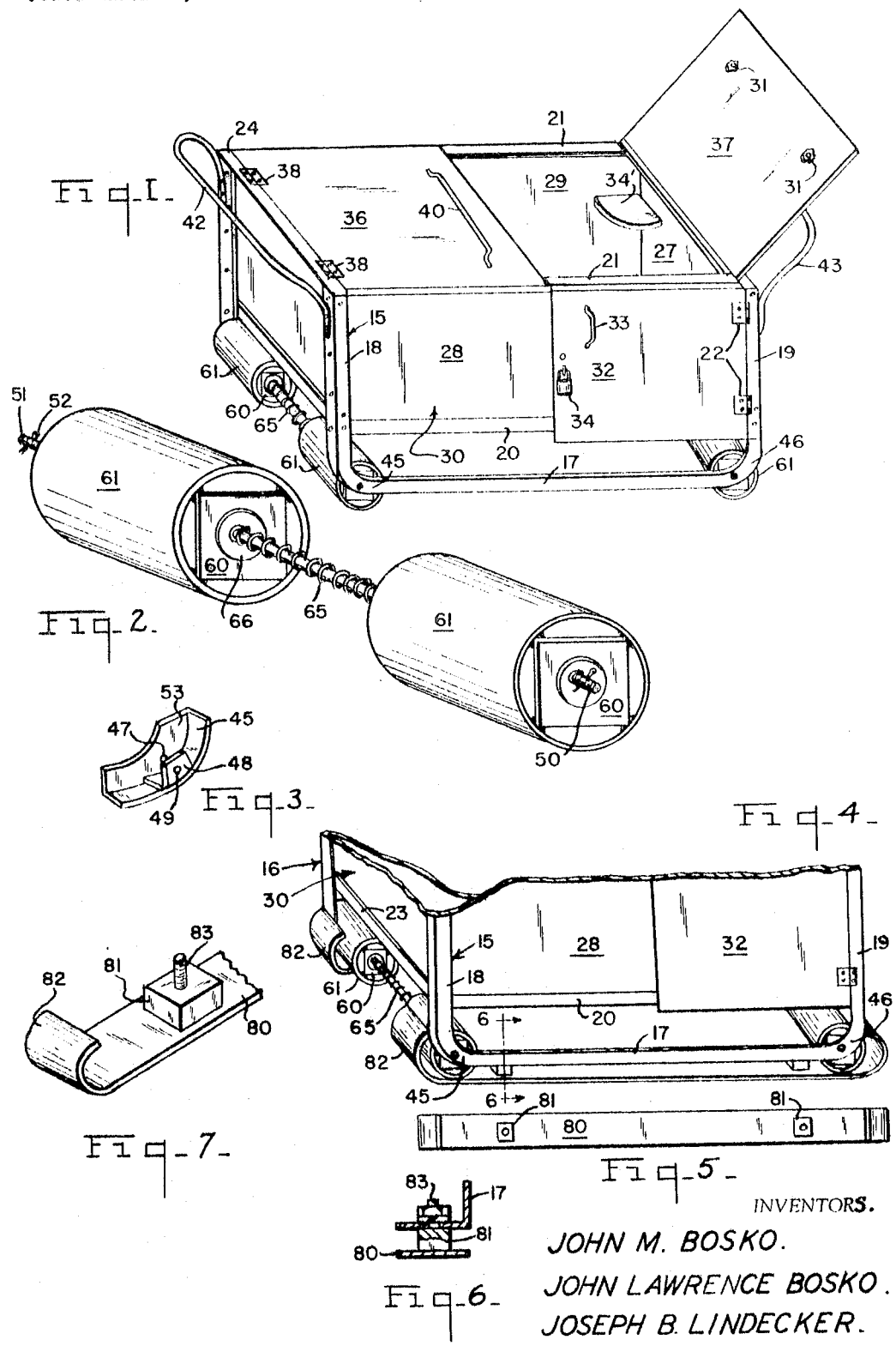
INVENTORS.
JOHN M. BOSKO.
JOHN LAWRENCE BOSKO.
JOSEPH B. LINDECKER.

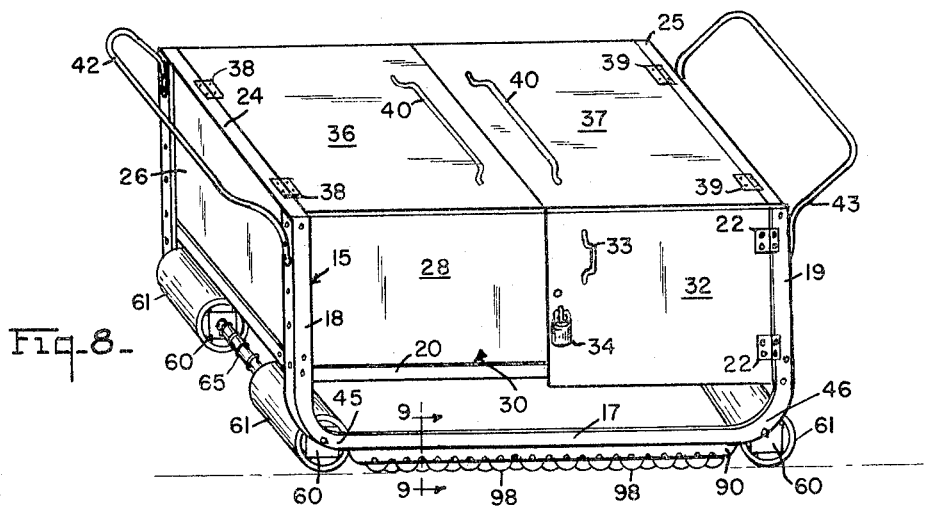
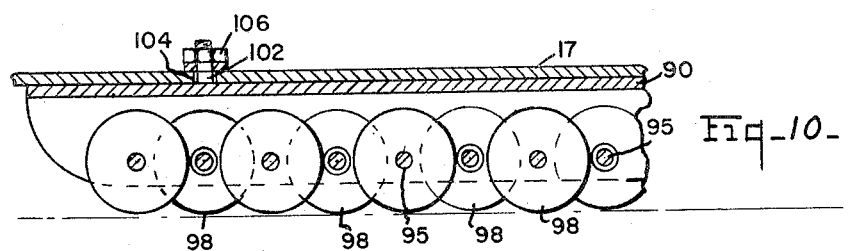
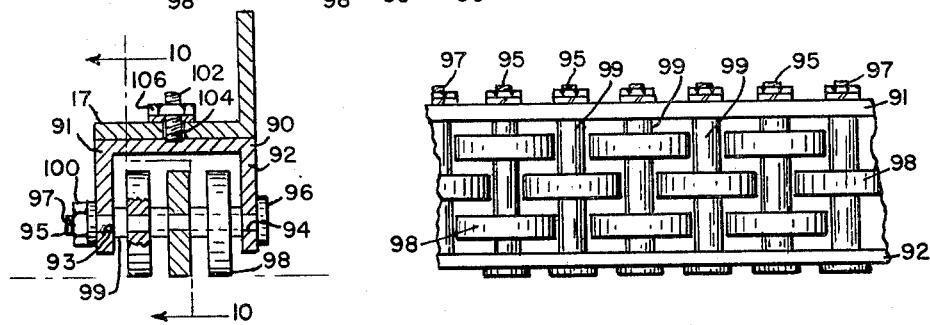
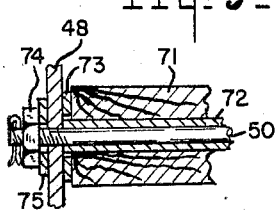
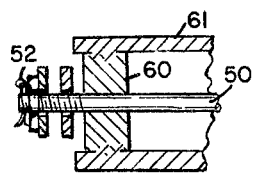
INVENTORS.
JOHN M. BOSKO.
JOHN LAWRENCE BOSKO.
JOSEPH B. LINDECKER.

3,266,813
MOBILE GARDEN AND REFUSE CART
John M. Bosko, 6691 Cleveland Road and Wall St., Ravenna, Ohio; John L. Bosko, 2095 Mountain Ave., Upland, Calif.; and Joseph B. Lindecker, Upland, Calif. (8100 Keystone Ave., Skokie, Ill.)
Filed Mar. 18, 1964, Ser. No. 352,831
7 Claims. (Cl. 280—8)

The present invention relates to a household mobile garden unit for safe, sanitary storage and sanitary clean-up or pickup service.

One object of the invention is to provide a refuse cart which may be manually mobilized, that is, a roller supported frame structure having an integral closed receptacle provided with a manually movable top portion and a portion of one side wall which may be selectively moved out of closing relation with the said receptacle.

Another object of the invention is to provide a convenient equipment device for storage of household disposal which can be easily rolled, moved anywhere upon the lawn near the home and then moved to the suitable location for pickup service.

Another object of the invention is to provide a manually movable cart which is equipped with transversely arranged rollers at each end thereof, the rollers so mounted that the cart can be steered to any portion by one person, or rolled over the grass, the rough gravel, or on concrete drive as desired.

Still another object of the present invention is to provide a mobile cart for the safe storage of garbage cans, or containers designed to hold waste materials, the cans or containers to be removed at will, the cart having a rigid side wall and a hinged side door and hinged cover member, the side door to be locked by a padlock to keep children from contact with the waste material therein.

A further object of the present invention is to provide a mobile unit with solid walls and movable part which will keep dogs, pets, or rats from access to the material therein.

A further object of the present invention is to provide a practical unit where left over house paint, turpentine, oil, gasoline or other flammable dangerous contents may be safely stored away from the home dwelling and easily moved thereto when desired without undue labor.

And still a further object of the present invention is to provide a convenient mobile garden unit for cleaning up the yard, garden or orchard and easily storing the debris therein.

Other objects and advantages of this invention will become apparent during the course of the following detailed description taken in connection with the accompanying drawing forming a part of this specification and in which drawing:

FIGURE 1 is a top perspective view of an embodiment of the preferred form of the improved mobile garden cart, with a top cover member in raised position and showing a shelf therein;

FIGURE 2 is a perspective front view of the rollers, or rotating cylinder members, which support the cart in a mobile manner;

FIGURE 3 is a perspective inside sectional view of the bushing portion of the frame through which the axle bar extends and is journalled thereby;

FIGURE 4 is a fragmentary perspective view of the mobile garden cart shown in FIG. 1, and having ski means, or runners, attached to the lower frame thereof;

FIGURE 5 is a top plan view of a ski, as shown attached to the cart of FIG. 4;

FIGURE 6 is a sectional view taken substantially on line 6—6 of FIG. 4;

FIGURE 7 is a fragmentary top perspective view of the forward end of the ski shown in FIG. 5;

FIGURE 8 is a top perspective view of the garden cart as shown in FIG. 1, both top covers in closed position, the side door closed and locked, and having a plurality of rollers rotatably mounted on shafts in a U-shaped, inverted frame, and the inverted frame attached to the longitudinal lower angle frame of the cart to facilitate drawing the cart up stairways and the like;

FIGURE 9 is a sectional view taken substantially on line 9—9 of FIG. 8;

FIGURE 10 is a sectional view taken substantially on line 10—10 of FIG. 9;

FIGURE 11 is a fragmentary plan view of the roller track looking toward the under side thereof and with parts broken away;

FIGURE 12 is a fragmentary sectional end view of a wooden roller mounted upon a metal tube arranged upon the steel rod or axle, showing the axle secured to bushing type support means; and FIGURE 13 is a fragmentary sectional end view of a steel roller welded to a plate type bushing and mounted upon a steel rod type axle.

In a general way, the garden cart is constructed of an angle-iron frame and a body with sheet-metal walls where closures are provided. The several parts are either bolted, welded or riveted together, as is usual in metal structures; flat corrugated embossed aluminum or steel sheets, Masonite fiber, plywood or fiber-glass material may be used if desired for the body thereof.

The supporting frame, shown in assembly in FIGS. 1, 4 and 8, comprises two U-shaped side members 15 and 16 with longitudinal horizontal members 17 and uprights 18 and 19 curved at the lower ends thereof and integrally formed with the longitudinal members 17. Extending between the corner uprights 18 and 19, and a short distance above members 17, are the longitudinal members 20. Extending between uprights 18 and 19, and at the upper ends thereof, are the longitudinal members 21. Between the uprights 18, and between the uprights 19 are the transverse members 23 arranged in the same horizontal plane with members 20. Between the uprights 18, and between the uprights 19, at the upper ends thereof, are the transverse members 24 and 25, respectively, arranged in the same horizontal plane with members 21. The corner uprights 18 and 19 together with the horizontal longitudinal and transvrse members 20, 23, 24 and 25 interposed between said uprights form a box-like cage for supporting the body shown generally by numeral 30.

Secured between the longitudinal frame members 17 is mounted at bottom plate (not shown). Attached to the frame are the opposite end walls 26 and 27. Attached to the frame are the opposite side walls 28 and 29, the side wall 28 extending from the upright 18 and to a point midway between uprights 18 and 19. Hingedly attached to the upright 19 is the side door 32 with hinges 22, said door extending to a point midway between uprights 18 and 19 and having its vertical free edge portion in adjacent, overlapping relationship with the side wall 28. The side door 32 is provided with a handle 33 to facilitate the opening and closing of same. Two top doors 36 and 37 are provided to close the top of the body 30, the top door 36 being attached to the upper cross member 24 of the frame by the hinges 38, and the top door 37 being attached to the upper cross member 25 of the frame by the hinges 39. The top doors are provided with handles 40 to facilitate the opening and closing of the top doors, secured thereto by nuts 31. On the exterior sides of uprights 18 and 19, at the upper ends thereof, are mounted and secured the hand bars 42 and 43 so that the cart can be easily pushed or pulled at either end. Any number of shelves 34' may be mounted within the body 30, if so desired. A pad lock 34 may be used with a hasp to lock the side door 32.

Mounted on the under side of the angle-iron frame of the cart are a plurality of rollers to make it mobile. The horizontal side members of the frame are integrally joined to the uprights 18 and 19 by curved sections, or juncture portions 45 and 46 of the frame. A fragmentary portion of a curved section, or juncture 45 is shown in perspective in FIG. 3, having a transverse hole 47 therein, and also showing a piece of steel angle welded to the horizontal portion thereof forming a bushing 48, with bushing hole 49 arranged therein adapted to journal the end of an axle shaft 50, clearly shown in FIGS. 2, 12 and 13. The cart having two junctures 45 at one end and two junctures 46 at the opposite end, is equipped to journal two axle shafts 50, one at each end of the cart.

Referring specifically to FIGURES 2, 12 and 13, it is clearly shown that the axles 50 are long enough to extend between the side members 17, the ends 51 being threaded, as well as supplied with transverse holes therein to receive cotter-keys 52. The ends 51 extend through the bushing holes 49 in bushing member 48 welded to junctures 45. The ends 51 of the axles 50 generally terminate between the bushing member 48 and vertical side flange portion 53, and are secured to the bushing member 48 by nuts with washers and assembled therewith, said nuts being locked thereon by cotter-keys 52. Should the axles 50 be extra long, the free ends thereof extend through transverse holes 47 in vertical flange portion of junctures 45 and 46. When steel rollers are used, as shown in FIGURES 1, 2, 8 and 13, plate type bushings 60 are welded in each end of cylindrical metal rollers 61, said plates 60 having central transverse holes therein providing journals for the axle 50. In assembly, two cylinders 61 are mounted upon each axle 50, spaced from each other by a coil compression type spring 65 mounted upon the shaft 50; a washer 66 is assembled upon the axle 50 and arranged between each end of the spring and the plate bushings 60. The spring separates the rollers but allows them to slide longitudinally upon the axle 50; this sliding action takes place when the cart is turned by the operator. The sliding of the rollers 61 in contact with a supporting surface performs a novel method of turning the cart and eliminates use of casters and the like.

When it is desired to use wooden rollers 71, as shown in FIG. 12, a tubular steel pipe 72 is assembled upon the axle 50 and extends substantially the entire length thereof, leaving exposed only the threaded end portions of the axle. The wooden roller 71 is separated from supporting flange 48 by a washer 73; the axle 50 is secured to the flange 48 by nut 74 and washer 75. The roller 71 may be made of any suitable material in place of wood, or may be covered with rubber or the like.

When the cart is pushed over ice, snow, or mud, runners or skis 80 may be attached to the longitudinal frame members 17. Referring specifically to FIGS. 4, 5, and 7, the runners 80 have blocks 81 fixed to the upper surfaces thereof and adjacent the upwardly curved end portions 82, each runner having two blocks with upwardly extending bolts 83 rigidily secured therewith. The runners 80 are assembled beneath the frame members 17, the bolts 83 extending through aligned holes in said members 17 and secured thereto by nuts or any suitable means. The curved end portions 82 extend under the outer ends of the rollers 61 when attached to members 17, whereby the weight of the load is distributed to the runners, relieving the frame from twisting and binding action when crossing ditches and the like, filled with ice and snow.

When the cart is to be drawn up stairways and the like, an inverted U-shaped channel 90 is attached to the underside of each frame member 17. The depending walls 91 and 92 of channel 90 are provided with longitudinally spaced shaft carrying holes 93 and 94, and longitudinally spaced shafts 95, having flat heads 96 and threaded free ends 97 are mounted in the holes 93 and 94; rollers 98 are journalled on the shafts and positioned with parts thereof extending upwardly into the said channels as well as below the channel for contacting any supporting surface, usually in the plane with the lowermost contacting surfaces of said rollers 61. The shafts 95 have tubular washers 99 assembled therewith whereby one shaft will support two rollers, while each adjacent shaft supports only one roller, the rollers beiing staggered in relation to the rollers of juxta-positioned shafts. The shafts are rigidly secured to the channel 90 by nuts 100. Each channel 90 has two studs 102 rigidly secured thereto and extending upwardly from the top surface thereof, the free ends of the studs 102 extending through aligned holes 104 in the frame members 17 and secured thereto by nuts 106. Therefore, the frame of the cart and the two channels 90 form tracks in which the rollers 98 are mounted, the tracks being held by bolts or studs to the side member 17, the rollers so assembled to facilitate drawing the cart up stairways and the like. The rollers 61, rolling and sliding on axles 50 provides means in combination with the cart and rollers 98 to provide a mobile cart suitable for use on rough surfaces and stairways, and runners 80 provides means for supporting the cart on and over snow and the like. Any suitable brake means may be attached to the frame of the cart to contact and hold the rollers 61 from turning while the cart is in storage.

It will be understood that changes may be made in the design or arrangement of the parts without departing from the scope of the novel concepts of the present invention.

We claim:

1. A mobile disposal garden storage and clean-up cart adapted to contain refuse cans, broken glass and flammable materials comprising a metal frame having a plurality of vertical uprights united to a plurality of horizontal members extending longitudinally and transversely there between, a receptacle having a plurality of vertical side and end walls, a solid bottom and a movable top closure carried by and secured to said frame, bearing means secured to each end of said frame adjacent the lowermost end portion of each of the corner vertical uprights, a shaft extending transversely beneath each end of said frame and journalled in said bearing means, a pair of elongated rollers rotatably and longitudinally slidably mounted upon each of said shafts, and a coil spring arranged upon each of said shafts between the pair of rollers thereon and in pressing engagement therewith normally yieldably resisting a longitudinal change in the position of either of said rollers during rotation thereof but permitting longitudinal slidable movement of one of said two rollers on the shaft during turning of the cart by an operator.

2. The cart according to claim 1 including side runners rigidly secured to the lowermost longitudinal horizontal members beneath said receptacle, said runners having upwardly curved end portions extending beneath the end portions of said rollers and upwardly adjacent the cylindrical surface thereof.

3. The cart according to claim 1 including a pair of side runners, said runners having semi-circular upwardly curved end portions, said runners being longer than the length of said cart, said runners assembled longitudinally and horizontally to the lowermost side members of said frame and having their upper surfaces in a plane commensurate with the lower supporting edge of the rollers and extending below the same.

4. The cart according to claim 1 including a pair of inverted U-shaped channel brackets detachably secured to the two longitudinal horizontal side members of said frame, the depending side webs of each of said channels having shaft carrying holes therein, longitudinally spaced shafts mounted in the holes in the side webs of the channel, roller wheels journalled on the shaft and positioned with parts thereof extending upwardly into the said channel, said roller wheels positioned on one of said shafts being staggered in relation to the roller wheels of juxta-positioned shafts and said shafts each having a flat headed end and a threaded end with a securing nut thereon for retaining the said shafts in operative positions in the side webs of the channels.

5. A mobile disposal garden storage and clean-up cart adapted to contain refuse cans and flammable materials comprising a rectangular shaped metal frame, said frame having U-shaped side angle iron members united to a plurality of horizontal members extending longitudinally and transversely therebetween, a receptacle having a plurality of vertical side and end walls, a solid horizontal bottom wall and two hingedly secured top closures, carried by and secured to said frame, each said U-shaped side angle iron member having vertical uprights joined to its horizontal member portion by curved junctures, bearing means secured to each of said junctures of said U-shaped side angle iron members, a shaft extending transversely beneath each end of said frame and journalled at its opposite ends in said bearings, a pair of elongated rollers rotatably and longitudinally slidably mounted upon each of said shafts, and a coil spring arranged upon each of said shafts between the pair of rollers thereon, said spring having its opposite ends in pressing engagement with the inner ends of said rollers, said rollers being biased outwardly on said shafts, whereby said spring resists longitudinal change in position of either of said rollers on a shaft but permits longitudinal sliding movement of one of said rollers with respect to the other roller on the shaft during turning of the cart by an operator.

6. A refuse cart, comprising a rectangular shaped metal frame having U-shaped side frame members rigidly connected with a plurality of horizontal longitudinal and transverse supporting members, a closed receptacle carried by and within the upper portion of said frame, said receptacle having a hinged side door and two hingedly attached top closures adapted to be opened to gain access to said receptacle, said U-shaped side frame members each having two vertical upright members joined to its lower horizontal and longitudinal member by an integral curved section, and bearing means welded within each of said curved sections, a shaft extending transversely beneath each end of said rectangular frame with its opposite ends journalled in the bearings in said curved sections, two wooden rollers rotatably mounted upon each of said shafts, a coil spring arranged upon each of said shafts between said wooden rollers thereon and in pressing engagement therewith yieldably resisting any longitudinal change in the position of either of said rollers on said shaft, an inverted U-shaped channel detachably secured beneath the horizontal member of each of said U-shaped side frame members, the depending webs of said channel having bolt holes therein, longitudinally spaced bolts mounted in the bolt holes in said webs, metal roller type wheels journalled upon said bolts, said wheels on a bolt staggered in relation to the wheels of a juxta-positioned bolt and means to secure said bolts in said holes in said webs for retaining said wheels in operative positions to said channel.

7. A refuse cart, comprising a rectangular shaped metal frame having a plurality of vertical uprights united to a plurality of horizontal longitudinal and transverse supporting members, a closed receptacle having a plurality of side walls, end walls, top closures and a bottom wall carried by and secured to and within the upper portion of said frame, said top closures hingedly connected to transverse upper end supporting members of said frame, a bearing member secured to the lower end portion of each upright in each corner of said frame, a shaft extending transversely beneath each end of said rectangular shaped metal frame and journalled in said bearing members, a pair of elongated rollers rotatably and longitudinally slidably mounted upon each of said shafts, and a coil spring arranged upon each of said shafts between the pair of rollers thereon, the ends of said coil springs being in pressing engagement with the inner ends of said rollers and yieldably resisting any longitudinal change in the position of either of said rollers during rotation thereof and permitting longitudinal slidable movement of one of said two rollers on the shaft during turning of the cart by an operator.

References Cited by the Examiner

UNITED STATES PATENTS

| | | | |
|---|---|---|---|
| 925,151 | 6/1909 | Adams | 280—13 |
| 2,565,237 | 8/1951 | Kinter | 280—5.24 |
| 2,720,989 | 10/1955 | Wormser | 280—47.16 |
| 2,788,220 | 4/1957 | Christensen | 280—79.1 |

FOREIGN PATENTS

| | | |
|---|---|---|
| 58,693 | 5/1941 | Denmark. |
| 317,816 | 6/1902 | France. |
| 11,627 | of 1902 | Great Britain. |
| 936,390 | 9/1963 | Great Britain. |

BENJAMIN HERSH, *Primary Examiner.*

MILTON L. SMITH, *Examiner.*